(12) United States Patent
Mori

(10) Patent No.: US 11,279,179 B2
(45) Date of Patent: Mar. 22, 2022

(54) PNEUMATIC TIRE

(71) Applicant: SUMITOMO RUBBER INDUSTRIES, LTD., Hyogo (JP)

(72) Inventor: Kazuma Mori, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 124 days.

(21) Appl. No.: 16/552,036

(22) Filed: Aug. 27, 2019

(65) Prior Publication Data

US 2020/0070593 A1    Mar. 5, 2020

(30) Foreign Application Priority Data

Aug. 28, 2018    (JP) .............................. JP2018-158840

(51) Int. Cl.
*B60C 13/00*    (2006.01)
*B60C 13/02*    (2006.01)

(52) U.S. Cl.
CPC ............ *B60C 13/02* (2013.01); *B60C 13/002* (2013.01)

(58) Field of Classification Search
CPC ....... B60C 11/01; B60C 13/00; B60C 13/001; B60C 13/002; B60C 13/003; B60C 13/02; B60C 13/023
See application file for complete search history.

(56) References Cited

U.S. PATENT DOCUMENTS

2017/0072750 A1    3/2017    Munezawa et al.

FOREIGN PATENT DOCUMENTS

| GB | 1509948 | * | 5/1978 |
| JP | 8-258518 | * | 10/1996 |
| JP | 2015-160490 A | | 9/2015 |
| WO | WO 2009/029088 | * | 3/2009 |

OTHER PUBLICATIONS

Machine translation of JP 8-258518, 1996.*

* cited by examiner

*Primary Examiner* — Justin R Fischer
(74) *Attorney, Agent, or Firm* — Greenblum & Bernstein, P.L.C.

(57) ABSTRACT

A tire includes a side protector at each side surface thereof. The tire satisfies mathematical formulas (1) and (2):

$$R2 > R1 \quad (1)$$
$$R2 > R3 \quad (2)$$

wherein R1 represents a ratio of lands in a zone, of the side surface, between a position of a radially inner end of the side protector and a position at 70% of a height of the tire, R2 represents a ratio of lands in a zone, of the side surface, between the position at 70% of the height of the tire and a position at 85% of the height of the tire, and R3 represents a ratio of lands in a zone, of the side surface, between the position at 85% of the height of the tire and a position at 97% of the height of the tire.

9 Claims, 5 Drawing Sheets

PNEUMATIC TIRE

This application claims priority on Patent Application No. 2018-158840 filed in JAPAN on Aug. 28, 2018. The entire contents of this Japanese Patent Application are hereby incorporated by reference.

BACKGROUND OF THE INVENTION

Field of the Invention

The present invention relates to pneumatic tires. Specifically, the present invention relates to improvement of side protectors of pneumatic tires.

Description of the Related Art

A tire that is mounted to a four-wheel-drive vehicle, a truck, or the like is frequently used for running on a bad road. The tire is required to have cut resistance. A tire in which a carcass including a large number of plies is used has excellent cut resistance. Meanwhile, the weight of the tire is high. The tire has inferior low fuel consumption performance. There is a limit to improvement of cut resistance by the large number of plies.

A tire including a buttress with a large thickness has excellent cut resistance. Meanwhile, the weight of the tire is high. The tire has inferior low fuel consumption performance. There is a limit to improvement of cut resistance by the thickness.

In a tire mounted on a rim, a portion in the vicinity of each bead is fitted to the rim. During running of a vehicle, a great load is applied to the vicinity of the bead. Improvement in durability of the portion in the vicinity of the bead is desired. In particular, for a tire to be mounted on a four-wheel-drive vehicle, a light truck, or the like, durability improvement is urgently necessary.

JP2015-160490 proposes a tire in which a bead including an inner apex and an outer apex is used. In the tire, a carcass is interposed between the inner apex and the outer apex. In the tire, a portion on which distortion is concentrated when a load is applied to the tire does not coincide with the carcass. The tire has excellent durability.

Even the tire in which the bead including the inner apex and the outer apex is used has insufficient cut resistance. An object of the present invention is to provide a pneumatic tire having excellent durability and cut resistance.

SUMMARY OF THE INVENTION

A pneumatic tire according to the present invention includes a tread, a pair of sidewalls, a pair of beads, and a carcass. The tire further includes, at each side surface thereof, a side protector at least parts of which project from a profile of the tire to form lands. Each bead includes a core, a first apex extending from the core outward in a radial direction, and a second apex located outward of the first apex in an axial direction. The carcass extends on and between one of the beads and the other of the beads along inner sides of the tread and the sidewalls. The carcass is interposed between the first apex and the second apex. The tire satisfies the following mathematical formulas (1) and (2):

$$R2 > R1 \quad (1)$$

$$R2 > R3 \quad (2)$$

wherein R1 represents a ratio of the lands in a zone, of the side surface, between a position of a radially inner end of the side protector and a position at 70% of a height of the tire, R2 represents a ratio of the lands in a zone, of the side surface, between the position at 70% of the height of the tire and a position at 85% of the height of the tire, and R3 represents a ratio of the lands in a zone, of the side surface, between the position at 85% of the height of the tire and a position at 97% of the height of the tire.

Since the pneumatic tire according to the present invention includes the first apex and the second apex, the pneumatic tire has excellent durability. For the tire, an excessive number of carcass plies is unnecessary, and an excessive buttress thickness is also unnecessary. Since the tire includes a side protector that satisfies the above mathematical formulas (1) and (2), the tire has excellent cut resistance even in the case where the number of carcass plies and the buttress thickness are not excessive.

Preferably, the position of the radially inner end of the side protector coincides with a position at 55% of the height of the tire or is outward of this position in the radial direction.

Preferably, a position of a radially outer end of the side protector coincides with the position at 97% of the height of the tire or is inward of this position in the radial direction.

Preferably, the ratio R2 is not less than 60%. Preferably, the ratio R3 is lower than the ratio R1.

Preferably, the side protector is separated into a plurality of elements by a plurality of grooves. Preferably, a central angle of a maximum width portion in a circumferential direction of each groove is not less than 20% and not greater than 40% of a pitch angle between two elements that are present with the groove interposed therebetween.

DESCRIPTION OF THE PREFERRED EMBODIMENTS

The following will describe in detail the present invention based on preferred embodiments with appropriate reference to the drawings.

Figure 1:
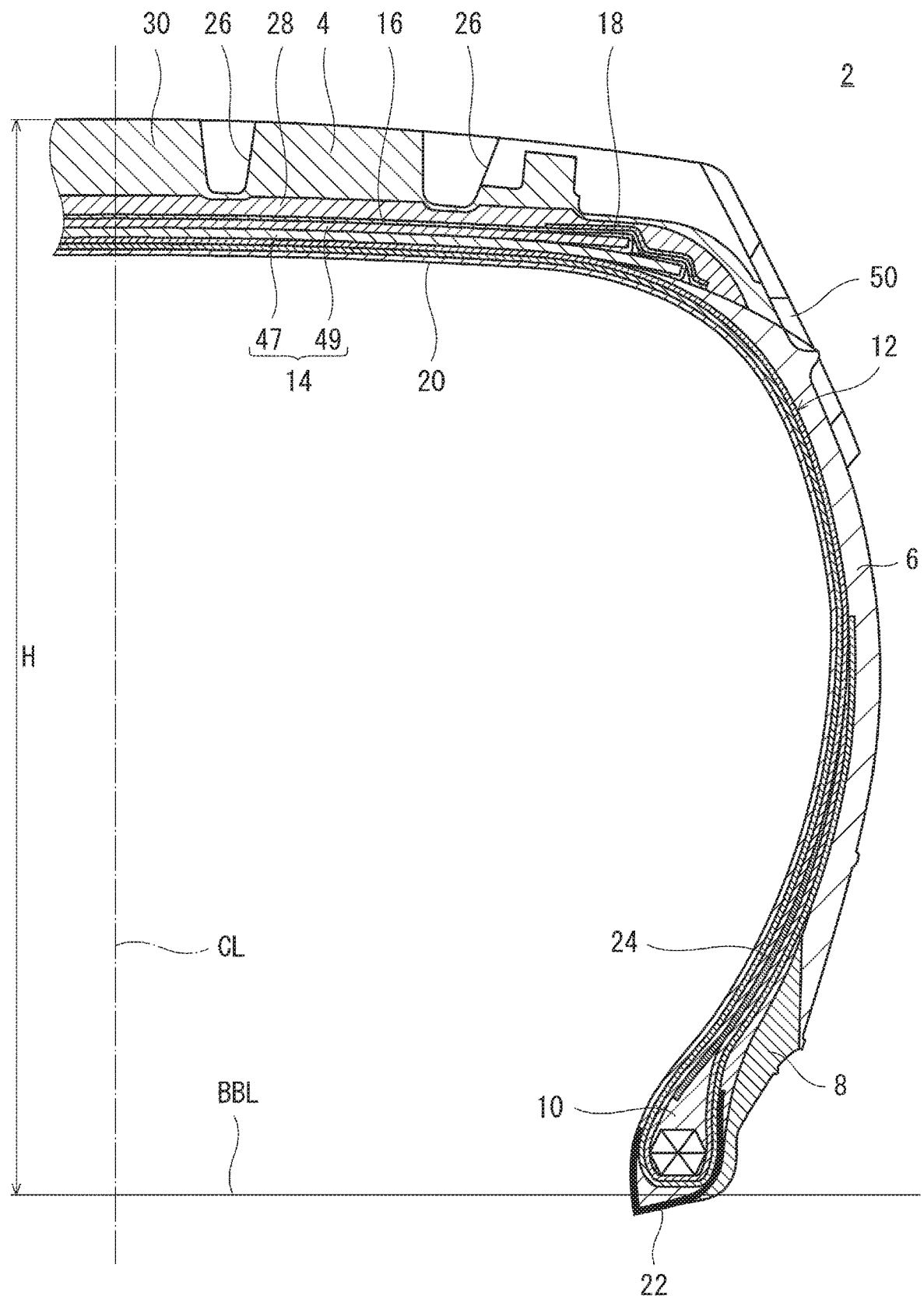
FIG. 1 is a cross-sectional view of a part of a pneumatic tire according to an embodiment of the present invention.
Figure 2:
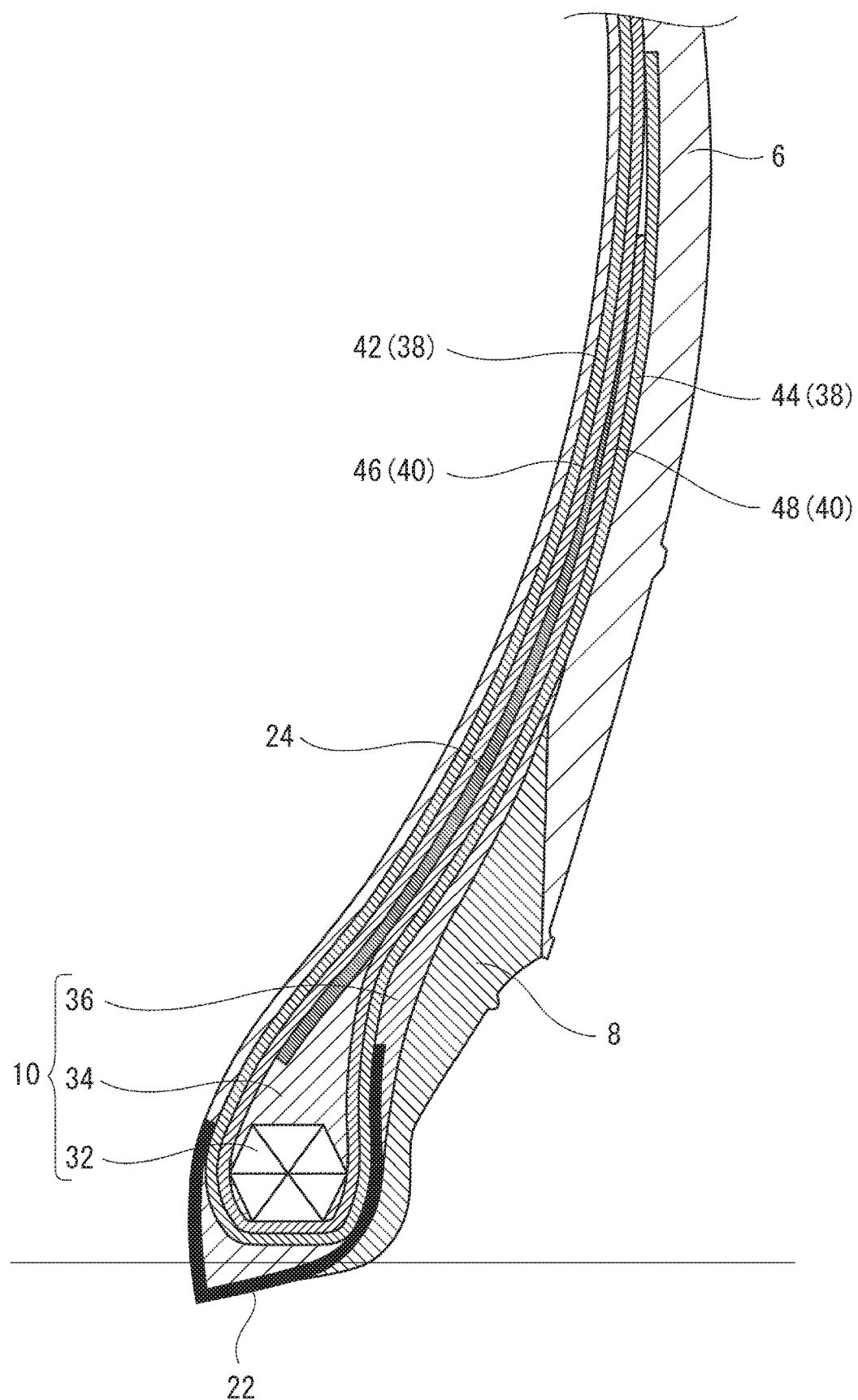
FIG. 2 is an enlarged cross-sectional view of a part of the tire in FIG. 1.

FIGS. 1 and 2 show a pneumatic tire 2. In FIG. 1, the up-down direction is the radial direction of the tire 2, the right-left direction is the axial direction of the tire 2, and the direction perpendicular to the surface of the sheet is the circumferential direction of the tire 2. In FIG. 1, an alternate long and short dash line CL represents the equator plane of the tire 2. The shape of the tire 2 is symmetrical about the equator plane CL except for a tread pattern. In FIG. 1, a solid line BBL is a bead base line. The bead base line BBL is a line that defines the rim diameter (see JATMA) of a rim (not shown) to which the tire 2 is mounted. The bead base line BBL extends in the axial direction. In FIG. 1, an arrow H represents the height of the tire 2 from the bead base line BBL.

The tire 2 includes a tread 4, a pair of sidewalls 6, a pair of clinches 8, a pair of beads 10, a carcass 12, a belt 14, a band 16, a pair of edge bands 18, an inner liner 20, a pair of chafers 22, and a pair of strips 24. The tire 2 is of a tubeless type. The tire 2 is mounted to a pickup truck.

The tread 4 has a shape projecting outward in the radial direction. The tread 4 forms a tread surface that is brought into contact with a road surface. Grooves 26 are formed on the tread 4. The tread pattern is formed by the grooves 26. The tread 4 includes a base layer 28 and a cap layer 30. The cap layer 30 is located outward of the base layer 28 in the radial direction. The cap layer 30 is layered on the base layer 28. The base layer 28 is formed from a crosslinked rubber that has excellent adhesiveness. The cap layer 30 is formed from a crosslinked rubber that has excellent wear resistance, heat resistance, and grip performance.

Each sidewall 6 extends from the edge of the tread 4 substantially inward in the radial direction. The sidewall 6 is formed from a crosslinked rubber that has excellent cut resistance and weather resistance. The sidewall 6 prevents damage to the carcass 12.

Each clinch 8 is located substantially inward of the sidewall 6 in the radial direction. The clinch 8 is joined to the radially inner end of the sidewall 6. The clinch 8 extends from the inner end of the sidewall 6 substantially inward in the radial direction. The clinch 8 is located outward of the bead 10 and the carcass 12 in the axial direction. The clinch 8 is formed from a crosslinked rubber that has excellent wear resistance. The clinch 8 comes into contact with a flange of the rim.

Each bead 10 is located inward of the clinch 8 in the axial direction. As shown in FIG. 2, the bead 10 includes a core 32, a first apex 34, and a second apex 36. The core 32 has a ring shape and includes a wound non-stretchable wire. A typical material of the wire is steel.

The first apex 34 extends from the core 32 outward in the radial direction. The first apex 34 is tapered outward in the radial direction. The first apex 34 is formed from a highly hard crosslinked rubber. A complex elastic modulus of the first apex 34 is preferably not less than 60 MPa. The first apex 34 having a complex elastic modulus of not less than 60 MPa contributes to the stiffness of the bead 10. The tire 2 has excellent durability. From this viewpoint, the complex elastic modulus is particularly preferably not less than 63 MPa. The complex elastic modulus is preferably not greater than 70 MPa. The first apex 34 having a complex elastic modulus of not greater than 70 MPa can reduce the vertical stiffness constant of the tire 2. With the tire 2, good ride comfort is maintained. From this viewpoint, the complex elastic modulus is particularly preferably not greater than 67 MPa.

The second apex 36 is located outward of the first apex 34 in the axial direction. The second apex 36 is located between the clinch 8 and the carcass 12 in the axial direction. The second apex 36 is tapered outward in the radial direction. The second apex 36 is also tapered inward in the radial direction. In the present embodiment, the outer end of the second apex 36 is located outward of the outer end of the first apex 34 in the radial direction. The second apex 36 is formed from a highly hard crosslinked rubber. A complex elastic modulus of the second apex 36 is preferably not less than 60 MPa. The second apex 36 having a complex elastic modulus of not less than 60 MPa contributes to the stiffness of the bead 10. The tire 2 has excellent durability. From this viewpoint, the complex elastic modulus is particularly preferably not less than 63 MPa. The complex elastic modulus is preferably not greater than 70 MPa. The second apex 36 having a complex elastic modulus of not greater than 70 MPa can reduce the vertical stiffness constant of the tire 2. With the tire 2, good ride comfort is maintained. From this viewpoint, the complex elastic modulus is particularly preferably not greater than 67 MPa.

The complex elastic moduli of the first apex 34, the second apex 36, and each strip 24 are measured according to the standards of "JIS K 6394". The measurement conditions are as follows.

Viscoelasticity spectrometer: "VESF-3" manufactured by Iwamoto Seisakusho
Initial strain: 10%
Dynamic strain: ±1%
Frequency: 10 Hz
Deformation mode: tension
Measurement temperature: 70° C.

The carcass 12 includes a first ply 38 and a second ply 40. The first ply 38 and the second ply 40 extend on and between the beads 10 at both sides along the tread 4 and the sidewalls 6. The first ply 38 is turned up around each core 32 from the inner side toward the outer side in the axial direction. Because of this turning-up, a main portion 42 and turned-up portions 44 are formed in the first ply 38. The second ply 40 is turned up around each core 32 from the inner side toward the outer side in the axial direction. Because of this turning-up, a main portion 46 and turned-up portions 48 are formed in the second ply 40. An end of each turned-up portion 44 of the first ply 38 is located outward of an end of each turned-up portion 48 of the second ply 40 in the radial direction. As is obvious from FIG. 2, the carcass 12 is present between the first apex 34 and the second apex 36. In other words, the carcass 12 is interposed between the first apex 34 and the second apex 36. In the present embodiment, the turned-up portion 44 and the turned-up portion 48 are interposed between the first apex 34 and the second apex 36.

Each carcass ply includes a large number of cords aligned with each other, and a topping rubber. The absolute value of the angle of each cord relative to the equator plane CL is 75° to 90°. In other words, the carcass 12 has a radial structure. The cords are formed from an organic fiber. Examples of preferable organic fibers include polyester fibers, nylon fibers, rayon fibers, polyethylene naphthalate fibers, and aramid fibers. The carcass 12 may be formed from one ply. The carcass 12 may be formed from three or more plies. A preferable number of carcass plies is one or two. The tire 2 including the carcass 12 formed from one or two plies is lightweight. The tire 2 has excellent low fuel consumption performance. In light of cut resistance and low fuel consumption performance, an ideal number of carcass plies is two.

The belt 14 is located inward of the tread 4 in the radial direction. The belt 14 is layered over the carcass 12. The belt 14 reinforces the carcass 12. The belt 14 includes an inner layer 47 and an outer layer 49. As is obvious from FIG. 1, in the axial direction, the width of the inner layer 47 is slightly larger than that of the outer layer 49. Although not shown in FIG. 1, each of the inner layer 47 and the outer layer 49 includes a large number of cords aligned with each other, and a topping rubber. Each cord is tilted relative to the equator plane CL. The absolute value of a tilt angle is generally not less than 10° and not greater than 35°. The direction in which the cords of the inner layer 47 are titled relative to the equator plane CL is opposite to the direction in which the cords of the outer layer 49 are tilted relative to the equator plane CL. The material of the cords is preferably steel. An organic fiber may be used for the cords. The width in the axial direction of the belt 14 is preferably equal to or greater than 0.7 times the maximum width of the tire 2. The belt 14 may include three or more layers.

The band 16 is located outward of the belt 14 in the radial direction. The width of the band 16 is larger than the width of the belt 14 in the axial direction. The band 16 includes a cord and a topping rubber, which are not shown. The cord is helically wound. The band 16 has a so-called jointless structure. The cord extends substantially in the circumferential direction. The angle of the cord relative to the circumferential direction is not greater than 5°. The angle is preferably not greater than 2°. The belt 14 is held by the cord, so that lifting of the belt 14 is suppressed. The cord is formed from an organic fiber. Examples of preferable organic fibers include nylon fibers, polyester fibers, rayon fibers, polyethylene naphthalate fibers, and aramid fibers.

The belt 14 and the band 16 form a reinforcing layer. The reinforcing layer reinforces the carcass 12. The reinforcing layer may be composed of only the belt 14. The reinforcing layer may be composed of only the band 16.

Each edge band 18 is located outward of the belt 14 in the radial direction and near an end of the belt 14. The edge band 18 includes a cord and a topping rubber, which are not shown. The cord is helically wound. The edge band 18 has a so-called jointless structure. The cord extends substantially in the circumferential direction. The angle of the cord relative to the circumferential direction is not greater than 5°. This angle is preferably not greater than 2°. The end of the belt 14 is held by the cord, so that lifting of the belt 14 is suppressed. The cord is formed from an organic fiber. Examples of preferable organic fibers include nylon fibers, polyester fibers, rayon fibers, polyethylene naphthalate fibers, and aramid fibers.

The inner liner 20 is located inward of the carcass 12. The inner liner 20 is joined to the inner surface of the carcass 12. The inner liner 20 is formed from a crosslinked rubber that has an excellent air blocking property. A typical base rubber of the inner liner 20 is an isobutylene-isoprene-rubber or a halogenated isobutylene-isoprene-rubber. The inner liner 20 maintains the internal pressure of the tire 2.

Each chafer 22 is located near the bead 10. As is obvious from FIGS. 1 and 2, the chafer 22 is turned up around the bead 10 from the inner side toward the outer side in the axial direction. One end of the chafer 22 is located outward of the carcass 12 in the axial direction. The one end of the chafer 22 is located between the turned-up portion 44 and the second apex 36 in the axial direction. The other end of the chafer 22 is located inward of the carcass 12 in the axial direction. The other end of the chafer 22 is located inward of the outer end of the first apex 34 in the radial direction. When the tire 2 is mounted onto the rim, the chafer 22 comes into contact with the rim. Due to this contact, the vicinity of the bead 10 is protected. In the present embodiment, the chafer 22 includes a fabric and a rubber with which the fabric is impregnated.

Each strip 24 is located outward of the two main portions 42 and 46 of the carcass 12 in the axial direction. The strip 24 extends from the bead 10 substantially outward in the radial direction along the main portion 46. The outer end of the strip 24 is located outward of the outer end of the clinch 8 in the radial direction. The inner end of the strip 24 is located between the main portion 46 and the first apex 34 in the axial direction. The strip 24 is formed from a crosslinked rubber. The strip 24 does not include any cord.

A complex elastic modulus of the strip 24 is preferably not less than 60 MPa. The strip 24 having a complex elastic modulus of not less than 60 MPa inhibits local distortion in the vicinity of the bead 10. From this viewpoint, the complex elastic modulus is particularly preferably not less than 63 MPa. The complex elastic modulus is preferably not greater than 70 MPa. The strip 24 having a complex elastic modulus of not greater than 70 MPa can reduce the vertical stiffness constant of the tire 2. With the tire 2, good ride comfort is maintained. From this viewpoint, the complex elastic modulus is particularly preferably not greater than 67 MPa.

Figure 3:
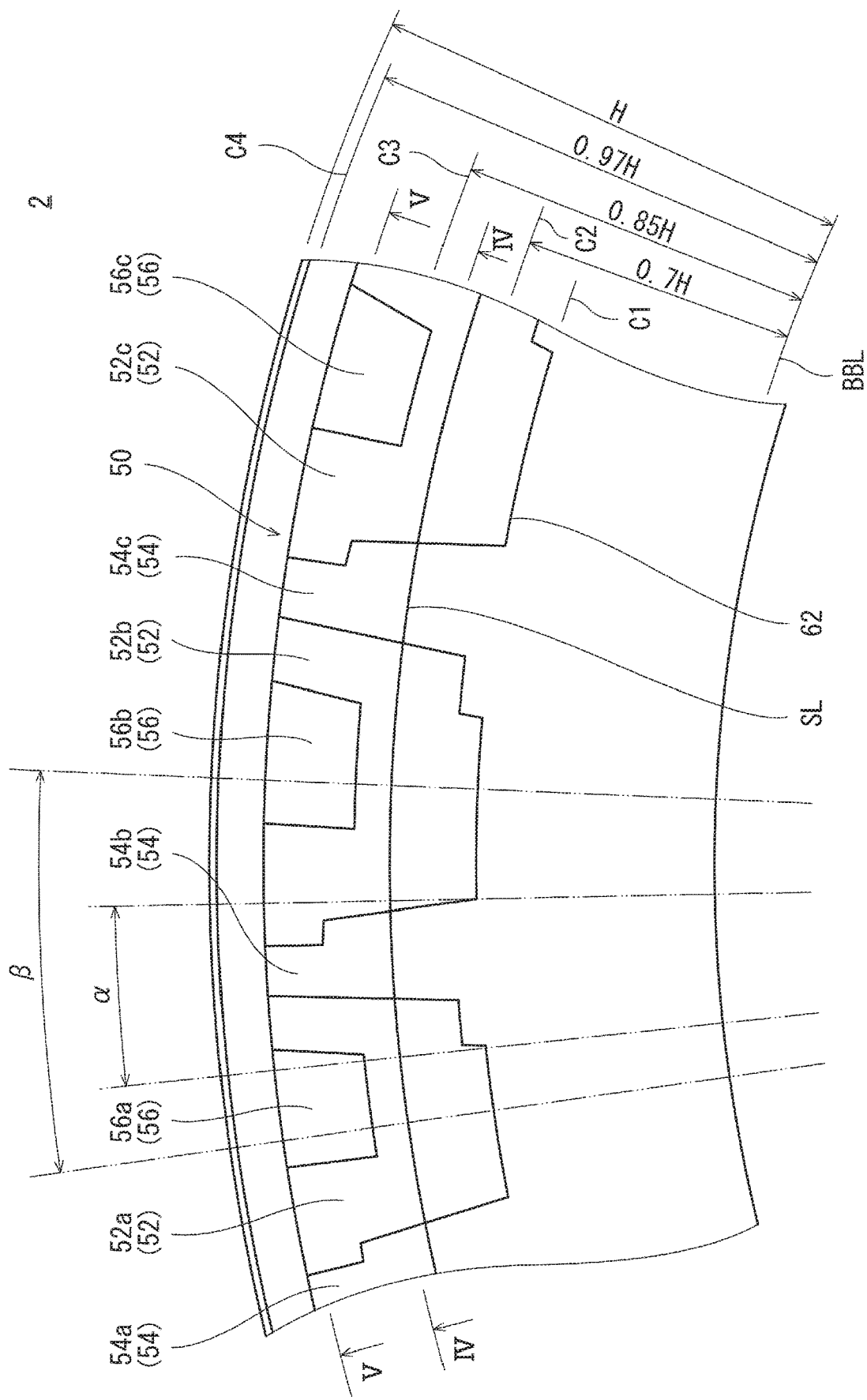
FIG. 3 is a side view of a part of the tire in FIG. 1.

FIG. 3 is a side view of a part of the tire 2 in FIG. 1. In FIG. 3, the tire 2 is seen from a point at infinity on the axis of the tire 2. In FIG. 3, reference character SL represents a seam line. The seam line SL corresponds to a parting line of a mold for the tire 2.

As shown in FIGS. 1 and 3, the tire 2 has a side protector 50 at each side surface thereof. The side surface is a surface that can be seen from a point at infinity on the axis of the tire 2, of the surface of the tire 2. As is obvious from FIG. 3, the side protector 50 has a ring shape. The side protector 50 contributes to the cut resistance of the side surface. The side protector 50 is formed from a crosslinked rubber. As is obvious from FIG. 1, a part of the side protector 50 is integrated with the tread 4. The other part of the side protector 50 is integrated with the sidewall 6.

Figure 4:
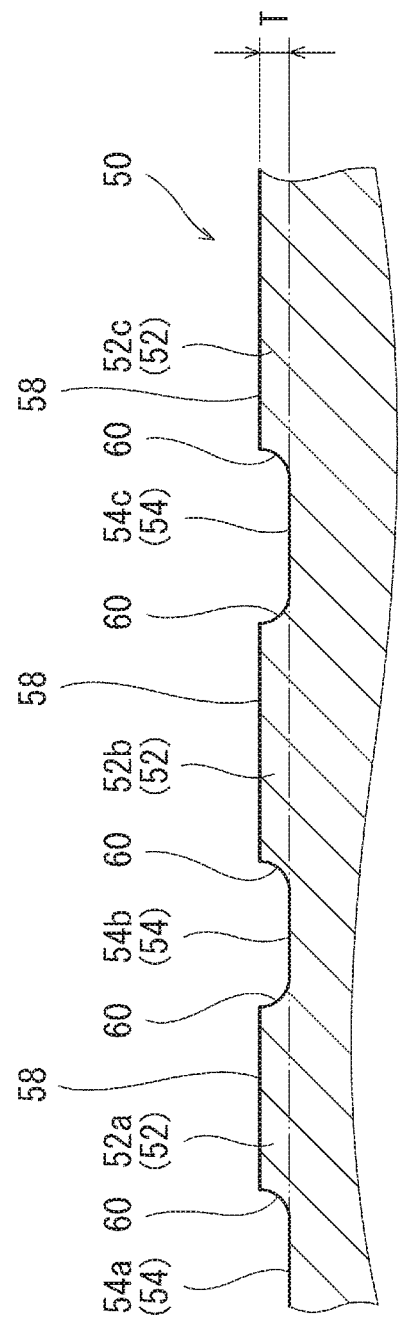
FIG. 4 is a development of a cross-section taken along a line IV-IV in FIG. 3.
Figure 5:
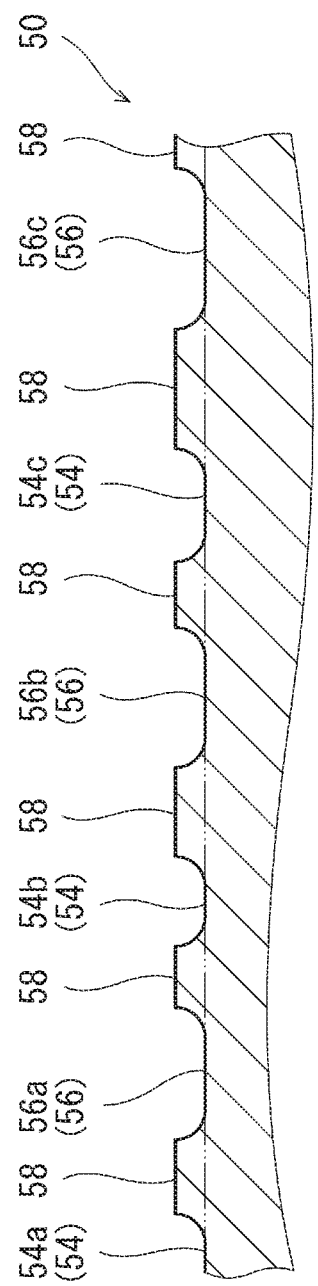
FIG. 5 is a development of a cross-section taken along a line V-V in FIG. 3.

FIG. 4 is a development of a cross-section taken along a line IV-IV in FIG. 3. FIG. 5 is a development of a cross-section taken along a line V-V in FIG. 3. As shown in FIGS. 3 to 5, the side protector 50 has a plurality of elements 52, a plurality of grooves 54, and a plurality of recessed portions 56. The elements 52 and the grooves 54 are alternately located along the circumferential direction. Therefore, the total number of the grooves 54 is equal to the total number of the elements 52. One recessed portion 56 is surrounded at both sides thereof in the axial direction and at the inner side thereof in the radial direction by one element 52. Therefore, the total number of the recessed portions 56 is equal to the total number of the elements 52. The tire 2 may include a side protector 50 that does not have any grooves 54. The tire 2 may include a side protector 50 that does not have any recessed portions 56.

As shown in FIG. 3, each element 52 is present across the seam line SL. In other words, a part of the element 52 is located outward of the seam line SL in the radial direction, and the remaining part of the element 52 is located inward of the seam line SL in the radial direction.

As shown in FIG. 3, each groove 54 is present across the seam line SL. In other words, a part of the groove 54 is located outward of the seam line SL in the radial direction, and the remaining part of the groove 54 is located inward of the seam line SL in the radial direction.

FIGS. 3 to 5 show a first element 52*a*, a second element 52*b*, a third element 52*c*, a first groove 54*a*, a second groove 54*b*, a third groove 54*c*, a first recessed portion 56*a*, a second recessed portion 56*b*, and a third recessed portion 56*c*. The second groove 54*b* is present between the first element 52*a* and the second element 52*b*. The first element 52*a* and the second element 52*b* are not continuous with each other. The third groove 54*c* is present between the second element 52*b* and the third element 52*c*. The second element 52*b* and the third element 52*c* are not continuous with each other. Similarly, a large number of elements 52 that are not continuous with each other are aligned over the entire circumference of the side protector 50. The side protector 50 is separated into the plurality of elements 52 by the plurality of grooves 54. The number of the grooves 54 on one side surface is preferably not less than 12 and not greater than 60, and particularly preferably not less than 16 and not greater than 48. Therefore, the number of the elements 52 on one side surface is preferably not less than 12 and not greater than 60, and particularly preferably not less than 16 and not greater than 48.

As shown in FIGS. 1, 4, and 5, the elements 52 project from a profile. In other words, parts of the side protector 50 project from the profile of the tire 2. The elements 52 have lands 58 and walls 60. Meanwhile, the surfaces of the grooves 54 coincide with the profile. The surfaces of the grooves 54 may project from the profile. In this case, the heights of the grooves 54 from the profile are smaller than the heights of the elements 52 from the profile. In the present invention, the profile is a contour of the outer surface of the tire 2. For the tire 2 having irregularities such as projections and recesses on the outer surface thereof, a contour obtained by assuming that the irregularities are not present is a profile.

In FIG. 3, reference character C1 represents a circle. For convenience sake, a circular arc that is a part of the circle C1 is shown in FIG. 3. The circle C1 passes through radially inner ends 62 of the elements 52 (the radially inner end of the side protector 50). The center of the circle C1 coincides with the axis of the tire 2.

In FIG. 3, reference character C2 represents another circle. For convenience sake, a circular arc that is a part of the circle C2 is shown in FIG. 3. The circle C2 passes through a position having a height that is 70% of the height H (also see FIG. 1) of the tire 2. The center of the circle C2 coincides with the axis of the tire 2.

In FIG. 3, reference character C3 represents still another circle. For convenience sake, a circular arc that is a part of the circle C3 is shown in FIG. 3. The circle C3 passes through a position having a height that is 85% of the height H (also see FIG. 1) of the tire 2. The center of the circle C3 coincides with the axis of the tire 2.

In FIG. 3, reference character C4 represents still another circle. For convenience sake, a circular arc that is a part of the circle C4 is shown in FIG. 3. The circle C4 passes through a position having a height that is 97% of the height H (also see FIG. 1) of the tire 2. The center of the circle C4 coincides with the axis of the tire 2.

In the present invention, a ratio R1 is calculated by the following mathematical formula.

$$R1 = (L1/S1)*100$$

In the mathematical formula, S1 represents the area of a first zone Z1, of the side surface, surrounded by the circle C1 and the circle C2, and L1 represents the total area of the lands 58 present in the first zone Z1. The areas S1 and L1 are measured in a state where the side surface is seen from a point at infinity on the axis of the tire 2.

In the present invention, a ratio R2 is calculated by the following mathematical formula.

$$R2 = (L2/S2)*100$$

In the mathematical formula, S2 represents the area of a second zone Z2, of the side surface, surrounded by the circle C2 and the circle C3, and L2 represents the total area of the lands 58 present in the second zone Z2. The areas S2 and L2 are measured in a state where the side surface is seen from a point at infinity on the axis of the tire 2.

In the present invention, a ratio R3 is calculated by the following mathematical formula.

$$R3 = (L3/S3)*100$$

In the mathematical formula, S3 represents the area of a third zone Z3, of the side surface, surrounded by the circle C3 and the circle C4, and L3 represents the total area of the lands 58 present in the third zone Z3. The areas S3 and L3 are measured in a state where the side surface is seen from a point at infinity on the axis of the tire 2.

The tire 2 satisfies the following mathematical formulas (1) and (2).

$$R2 > R1 \quad (1)$$

$$R2 > R3 \quad (2)$$

In other words, the ratio R2 of the lands 58 in the second zone Z2 is higher than the ratio R1 of the lands 58 in the first zone Z1 and is higher than the ratio R3 of the lands 58 in the third zone Z3.

When the tire 2 rolls, distortion is concentrated on the second zone Z2. In the tire 2 in which the ratio R2 of the lands 58 in the second zone Z2 is high, the side protector 50 can greatly contribute to cut resistance. In light of cut resistance, the ratio R2 is preferably not less than 40%, more preferably not less than 60%, and particularly preferably not less than 70%. In light of low fuel consumption performance and ride comfort, the ratio R2 is preferably not greater than 95%, more preferably not greater than 90%, and particularly preferably not greater than 85%.

The ratio R1 of the lands 58 in the first zone Z1 is lower than the ratio R2 of the lands 58 in the second zone Z2. Therefore, the tire 2 is lightweight. The tire 2 has excellent low fuel consumption performance. In light of low fuel consumption performance, the ratio R1 is preferably not greater than 70% and particularly preferably not greater than 65%. In light of cut resistance, the ratio R1 is preferably not less than 40% and particularly preferably not less than 50%.

The ratio R3 of the lands 58 in the third zone Z3 is lower than the ratio R2 of the lands 58 in the second zone Z2. Therefore, the tire 2 is lightweight. Furthermore, the rolling resistance of the tire 2 is low. The tire 2 has excellent low fuel consumption performance. In light of low fuel consumption performance, the ratio R3 is preferably not greater than 65% and particularly preferably not greater than 55%. In light of cut resistance, the ratio R3 is preferably not less than 25% and particularly preferably not less than 35%.

The third zone Z3 is close to the tread 4. The ratio R3 of the third zone Z3 is preferably lower than the ratio R2 and lower than the ratio R1. The rolling resistance of the tire 2 is low. The tire 2 has excellent low fuel consumption performance. In the present embodiment, a low ratio R3 is achieved by the recessed portions 56.

The difference (R2−R1) between the ratio R2 and the ratio R1 is preferably not less than 5% and particularly preferably not less than 10%. The difference (R2−R1) is preferably not greater than 40%.

The difference (R2−R3) between the ratio R2 and the ratio R3 is preferably not less than 10% and particularly preferably not less than 15%. The difference (R2−R3) is preferably not greater than 45%.

The difference (R1−R3) between the ratio R1 and the ratio R3 is preferably not less than 5% and particularly preferably not less than 10%. The difference (R1−R3) is preferably not greater than 30%.

As described above, the position of the circle C1 is the position of the radially inner end 62 of the side protector 50. The position at the height from the bead base line BBL to the circle C1 preferably coincides with a position at 55% of the height H of the tire 2 or is outward of this position in the radial direction. In other words, preferably, the side protector 50 is not present inward of the position at 55% of the height H of the tire 2 in the radial direction. The tire 2 is lightweight. Therefore, the tire 2 has excellent low fuel consumption performance.

The position of the radially outer end of the side protector 50 preferably coincides with a position at 97% of the height H of the tire 2 or is inward of this position in the radial direction. In other words, preferably, the side protector 50 is not present outward of the position at 97% of the height H of the tire 2 in the radial direction. The rolling resistance of the tire 2 is low. Therefore, the tire 2 has excellent low fuel consumption performance.

In FIG. 3, reference character α represents the central angle of a maximum width portion in the circumferential direction of the groove 54. In the example of FIG. 3, the central angle 7a of the second groove 54b is shown. In FIG. 3, reference character β represents the pitch angle between the two elements 52 that are present with the groove 54 interposed therebetween. In the example of FIG. 3, the pitch angle β between the first element 52a and the second element 52b is shown. The ratio of the central angle α to the pitch angle β is preferably not less than 20% and not greater than 40%. The rolling resistance of the tire 2 in which this ratio is not less than 20% is low. Therefore, the tire 2 has excellent low fuel consumption performance. In light of low fuel consumption performance, this ratio is particularly preferably not less than 25%. The tire 2 in which this ratio is not greater than 40% has excellent cut resistance. In light of cut resistance, this ratio is particularly preferably not greater than 35%. In the tire 2 in which the angle α or the angle β is not uniform, the average of all the central angles in the side surface is the angle α, and the average of all the pitch angles in the side surface is the angle β.

In FIG. 4, an arrow T represents the thickness of the side protector 50. The thickness T is preferably not less than 1.0 mm and not greater than 5.0 mm. The side protector 50 having a thickness T of not less than 1.0 mm can contribute to cut resistance. From this viewpoint, the thickness T is more preferably not less than 1.5 mm and particularly preferably not less than 2.0 mm. The tire 2 including the side protector 50 having a thickness T of not greater than 5.0 mm is lightweight. Furthermore, the rolling resistance of the tire 2 is low. From these viewpoints, the thickness T is more preferably not greater than 4.5 mm and particularly preferably not greater than 4.0 mm.

A hardness of the side protector 50 is preferably not less than 40 and not greater than 80. The side protector 50 having a hardness of not less than 40 can contribute to cut resistance. From this viewpoint, the hardness is more preferably not less than 50 and particularly preferably not less than 60. The rolling resistance of the tire 2 including the side protector 50 having a hardness of not greater than 80 is low. From this viewpoint, the hardness is more preferably not greater than 75 and particularly preferably not greater than 70. The hardness is measured by pressing a JIS-A hardness scale against the side surface shown in FIG. 3. The temperature at the time of measurement is 23° C.

In the tire 2, the dimensions and angles of each component of the tire 2 are measured in a state where the tire 2 is mounted on a normal rim and inflated with air to a normal internal pressure, unless otherwise specified. During the measurement, no load is applied to the tire 2. In the present specification, the normal rim means a rim specified in a standard on which the tire 2 is based. The "standard rim" in the JATMA standard, the "Design Rim" in the TRA standard, and the "Measuring Rim" in the ETRTO standard are normal rims. In the present specification, the normal internal pressure means an internal pressure specified in the standard on which the tire 2 is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. In the case where the tire 2 is designed for a passenger car, the dimensions and angles are measured in a state where the internal pressure is 180 kPa.

EXAMPLES

Example 1

A pneumatic tire having the structure shown in FIGS. 1 to 5 was obtained. The size of the tire was LT265/70R17. The tire includes so-called double type apexes. Each double type apex includes a first apex and a second apex as shown in FIG. 2. The number of carcass plies of the tire is two. The tire includes side protectors. The ratio of the height from the bead base line BBL to the circle C1 passing through the radially inner end of the side protector, to the tire height H, is 60%. The ratio R1 is 60%, the ratio R2 is 70%, and the ratio R3 is 50%.

Examples 2 to 8 and Comparative Example 1

Pneumatic tires of Examples 2 to 8 and Comparative Example 1 were obtained in the same manner as Example 1, except the ratios R1, R2, and R3 were set as shown in Tables 1 and 2 below.

Examples 9 and 101

Pneumatic tires of Examples 9 and 10 were obtained in the same manner as Example 1, except the ratio of the height from the bead base line BBL to the circle C1, to the tire height H, was set as shown in Table 3 below.

Comparative Example 2

A pneumatic tire of Comparative Example 2 was obtained in the same manner as Example 1, except no side protector was provided.

Comparative Example 3

A pneumatic tire of Comparative Example 3 was obtained in the same manner as Example 1, except no side protector was provided, the number of carcass plies was three, and single type apexes were used. Each bead of the tire has one apex. The apex is interposed between the main portion and the turned-up portion of a carcass. The tire has the same structure as a commercially available product.

[Durability]

Each tire was fitted to a normal rim and inflated with air to an internal pressure of 550 kPa. The tire was mounted to a drum type tire testing machine, and a vertical load of 14.22 kN was applied to the tire. Running with the tire on a drum having a radius of 1.7 m at a speed of 100 km/h was performed. A running distance until damage to the tire was recognized was measured. The result is shown as an index in Tables 1 to 3 below. The higher the value is, the better the result is.

[Cut Resistance]

Each tire was fitted to a normal rim and inflated with air to an internal pressure of 550 kPa. The tire was mounted to a four-wheel-drive vehicle. The four-wheel-drive vehicle was caused to run on a road surface on which debris was scattered. The running distance was 1500 km. The sizes (length×depth) of cuts of the tire were measured. The reciprocal of the total value of the sizes of all the cuts was calculated. The result is shown as an index in Tables 1 to 3 below. The higher the value is, the better the result is.

[Low Fuel Consumption Performance]

Each tire was fitted to a normal rim and inflated with air to an internal pressure of 550 kPa. The tire was mounted to a four-wheel-drive vehicle. The four-wheel-drive vehicle was caused to run on a circuit at a speed of 50 km/h. The running distance per unit fuel (km/L) when the running distance was 1000 km was calculated. The result is shown as an index in Tables 1 to 3 below. The higher the value is, the better the result is.

[Weight]

The weight of each tire was measured, and the reciprocal of this value was calculated. The result is shown as an index in Tables 1 to 3 below. The higher the value is, the better the result is.

TABLE 1

Results of Evaluation

| | Example 2 | Example 3 | Example 1 | Example 4 | Example 5 |
|---|---|---|---|---|---|
| Type of apex | Double FIG. 2 | Double FIG. 2 | Double FIG. 2 | Double FIG. 2 | Double FIG. 2 |
| Carcass ply | 2 | 2 | 2 | 2 | 2 |
| Height (%) of Cl | 60 | 60 | 60 | 60 | 60 |
| R1 (%) | 40 | 50 | 60 | 65 | 55 |
| R2 (%) | 70 | 70 | 70 | 70 | 70 |
| R3 (%) | 30 | 40 | 50 | 55 | 55 |
| α/β (%) | 30 | 30 | 30 | 30 | 30 |
| Durability | 110 | 110 | 110 | 110 | 110 |
| Cut resistance | 105 | 110 | 115 | 115 | 110 |
| Low fuel consumption performance | 110 | 105 | 105 | 100 | 105 |
| Lightness | 105 | 105 | 105 | 100 | 105 |

TABLE 2

Results of Evaluation

| | Comp. Example 1 | Example 6 | Example 7 | Example 8 |
|---|---|---|---|---|
| Type of apex | Double FIG. 2 | Double FIG. 2 | Double FIG. 2 | Double FIG. 2 |
| Carcass ply | 2 | 2 | 2 | 2 |
| Height (%) of Cl | 60 | 60 | 60 | 60 |
| R1 (%) | 70 | 50 | 40 | 70 |
| R2 (%) | 70 | 60 | 50 | 80 |
| R3 (%) | 70 | 40 | 30 | 60 |
| α/β (%) | 30 | 40 | 50 | 20 |
| Durability | 105 | 110 | 110 | 110 |
| Cut resistance | 115 | 105 | 105 | 115 |
| Low fuel consumption performance | 100 | 105 | 105 | 100 |
| Lightness | 100 | 105 | 105 | 100 |

TABLE 3

Results of Evaluation

| | Example 9 | Example 10 | Comp. Example 2 | Comp. Example 3 |
|---|---|---|---|---|
| Type of apex | Double FIG. 2 | Double FIG. 2 | Double FIG. 2 | Single |
| Carcass ply | 2 | 2 | 2 | 3 |
| Height (%) of Cl | 80 | 40 | — | — |
| R1 (%) | 60 | 60 | — | — |
| R2 (%) | 70 | 70 | — | — |
| R3 (%) | 50 | 50 | — | — |
| α/β (%) | 30 | 30 | — | — |
| Durability | 110 | 110 | 110 | 100 |
| Cut resistance | 110 | 115 | 90 | 100 |
| Low fuel consumption performance | 105 | 100 | 110 | 100 |
| Lightness | 105 | 100 | 110 | 100 |

As shown in Tables 1 to 3, the pneumatic tire of each Example is excellent in various performance characteristics. From the results of evaluation, advantages of the present invention are clear.

The tire according to the present invention can be mounted to various vehicles. The above descriptions are merely illustrative examples, and various modifications can be made without departing from the principles of the present invention.

What is claimed is:

1. A pneumatic tire comprising:
a tread a pair of sidewalls, a pair of beads, and a carcass, wherein
the tire further comprises, at each side surface thereof, a side protector at least parts of which project from a profile of the tire to form lands,
each bead include a core, a first apex extending from the core outward in a radial direction, and a second apex located outward of the first apex in an axial direction,
the carcass extends on and between one of the beads and the other of the beads along inner sides of the tread and the sidewalls,
the carcass is interposed between the first apex and the second apex, and
the tire satisfies the following mathematical formulas (1) and (2):

$$R2 > R1 \quad (1)$$

$$R2 > R3 \quad (2)$$

Wherein R1 represents a ration of the lands in a zone, of the side surface, between a position of a radially inner end of the side protector and a position at 70% of a height of the tire, R2 represents a ratio of the lands in a zone, of the side surface, between the position at 70% of the height of the tire and a position at 85% of the height of the tire, and R3 represents a ration of the lands in a zone, of the side surface, between the position at 85% of the height of the tire and a position at 97% of the height of the tire, and R1 is greater than 0.

2. The pneumatic tire according to claim 1, wherein the position of the radially inner end of the side protector coincides with a position at 55% of the height of the tire or is outward of this position in the radial direction.

3. The pneumatic tire according to claim 1, wherein a position of a radially outer end of the side protector coincides with the position at 97% of the height of the tire or is inward of this position in the radial direction.

4. The pneumatic tire according to claim 1, wherein the ratio R2 is not less than 60%.

5. The pneumatic tire according to claim 1, wherein the ratio R3 is lower than the ratio R1.

6. The pneumatic tire according to claim 1, wherein the side protector is separated into a plurality of elements by a plurality of grooves.

7. The pneumatic tire according to claim 6, wherein a central angle of a maximum width portion in a circumferential direction of each groove is not less than 20% and not greater than 40% of a pitch angle between two elements that are present with the groove interposed therebetween.

8. The pneumatic tire according to claim 2, wherein the position of the radially inner end of the side protector coincides with a position at 60% of the height of the tire or is outward of this position in the radial direction.

9. The pneumatic tire according to claim 1, wherein a difference (R2−R1) between the ratio R2 and the ratio R1 is not less than 10%.

* * * * *

UNITED STATES PATENT AND TRADEMARK OFFICE
CERTIFICATE OF CORRECTION

| | |
|---|---|
| PATENT NO. | : 11,279,179 B2 |
| APPLICATION NO. | : 16/552036 |
| DATED | : March 22, 2022 |
| INVENTOR(S) | : K. Mori |

It is certified that error appears in the above-identified patent and that said Letters Patent is hereby corrected as shown below:

In the Claims

At Column 12, Line 32 (Claim 1, Line 2), please change "tread a" to -- tread, a --
At Column 12, Line 37 (Claim 1, Line 7), please change "include a" to -- includes a --

Signed and Sealed this
Twenty-fifth Day of October, 2022

Katherine Kelly Vidal
*Director of the United States Patent and Trademark Office*